US006894401B2

(12) United States Patent
Beeson et al.

(10) Patent No.: US 6,894,401 B2
(45) Date of Patent: *May 17, 2005

(54) ENGINE DRIVEN INVERTER WELDING POWER SUPPLY

(75) Inventors: Richard Beeson, Appleton, WI (US); Stephen Li, Appleton, WI (US); Alan Smith, Fremont, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/629,367

(22) Filed: Jul. 29, 2003

(65) Prior Publication Data

US 2004/0060912 A1 Apr. 1, 2004

Related U.S. Application Data

(63) Continuation of application No. 10/262,355, filed on Sep. 30, 2002, now Pat. No. 6,674,179, which is a continuation of application No. 09/962,997, filed on Sep. 24, 2001, now Pat. No. 6,469,401, which is a continuation of application No. 09/542,974, filed on Apr. 4, 2000, now Pat. No. 6,310,321, which is a continuation of application No. 09/238,361, filed on Jan. 27, 1999, now Pat. No. 6,111,217, which is a continuation of application No. 08/858,129, filed on May 19, 1997, now Pat. No. 5,968,385.

(51) Int. Cl.[7] .............................. B23K 9/10; H02P 9/04

(52) U.S. Cl. .................... 290/1 A; 219/133; 290/40 R; 322/37

(58) Field of Search .......................... 219/133, 130.21, 219/130.33, 137 PS; 290/1 A, 40 F, 40 R; 322/17, 37, 29, 7

(56) References Cited

U.S. PATENT DOCUMENTS

| 2,458,658 A | 1/1949 | Tyrner |
| 2,804,553 A | 8/1957 | McFarland |

(Continued)

FOREIGN PATENT DOCUMENTS

| CA | 1 268 518 | 5/1990 |
| EP | 0038854 | 5/1981 |

(Continued)

OTHER PUBLICATIONS

Operator's Manual Kubota Diesel Engine Date unknown.

Primary Examiner—Clifford C. Shaw
(74) Attorney, Agent, or Firm—George R. Corrigan (57) ABSTRACT

A method and apparatus for welding with an engine driven inverter power supply includes generating an ac output with an engine and generator. The output is rectified and inverted to provide an ac inverter output. The engine is controlled using feedback indicative of a welding output operating parameter. The feedback may also be taken from the inverter or generator, and the generator may be controlled instead of or in addition to the engine. Engine parameters that may be controlled include engine speed, selecting between an idle speed and a run speed, a throttle position, a fuel pump, an injection timer, a fuel to air ratio, fuel consumption and ignition timing. Another aspect of the invention is having the feedback be responsive to one or more of the welding current, welding voltage, welding power, or functions thereof. The feedback may be responsive to the current, voltage, power, ripple and functions thereof. An aux power output is derived directly from the generator and feedback from the aux load is used to determine if the engine should be idling or running at high speed.

34 Claims, 8 Drawing Sheets

U.S. PATENT DOCUMENTS

| | | |
|---|---|---|
| 3,513,325 A | 5/1970 | Tharp |
| 3,597,623 A | 8/1971 | Gilardi |
| 3,728,516 A | 4/1973 | Daspit |
| 3,889,178 A | 6/1975 | Jackson |
| 3,912,980 A | 10/1975 | Crump et al. |
| 3,928,746 A | 12/1975 | Ericsson |
| 3,961,154 A | 6/1976 | Ericsson |
| 4,159,408 A | 6/1979 | Lifshits et al. |
| 4,247,752 A | 1/1981 | Stringer |
| 4,314,195 A | 2/1982 | Muter |
| 4,465,920 A | 8/1984 | Hoyt, Jr. et al. |
| 4,794,232 A | 12/1988 | Kimbrough et al. |
| 4,870,248 A | 9/1989 | Gilliland |
| 4,952,774 A | 8/1990 | Sugimoto et al. |
| 4,994,646 A | 2/1991 | Tabata et al. |
| 5,166,567 A | 11/1992 | Kneisley |
| 5,355,075 A | 10/1994 | Wilson, III |
| 5,408,067 A | 4/1995 | Crouse |
| 5,444,214 A | 8/1995 | Crouse |
| 5,636,114 A | 6/1997 | Bhagwat et al. |
| 5,637,246 A | 6/1997 | Ikegami et al. |
| 5,670,070 A | 9/1997 | Clark et al. |
| 5,703,410 A * | 12/1997 | Maekawa .................... 322/29 |
| 5,708,254 A | 1/1998 | Ikegami et al. |
| 5,861,604 A | 1/1999 | McLean |
| 5,968,385 A | 10/1999 | Beeson et al. |
| 6,111,217 A | 8/2000 | Beeson et al. |
| 6,236,014 B1 | 5/2001 | Ulrich |
| 6,310,321 B1 | 10/2001 | Beeson et al. |
| 6,329,636 B1 | 12/2001 | Geissler |
| 6,348,671 B1 | 2/2002 | Fosbinder et al. |
| 6,469,401 B2 * | 10/2002 | Beeson et al. .............. 219/133 |
| 6,674,179 B2 * | 1/2004 | Beeson et al. .............. 219/133 |

FOREIGN PATENT DOCUMENTS

| | | |
|---|---|---|
| EP | 0820832 A1 | 5/1998 |
| FR | 2565517 | 12/1985 |
| GB | 2162704 | 3/1988 |

* cited by examiner

ENGINE DRIVEN INVERTER WELDING POWER SUPPLY

This is a continuation of, and claims the benefit of the filing date of, U.S. patent application Ser. No. 10/262,355, filed Sep. 30, 2002, now U.S. Pat. No. 6,674,179 entitled Engine Driven Invertor With Feedback Control, which is a continuation of U.S. patent application Ser. No. 09/962,997, filed Sept. 24, 2001, entitled Engine Driven Invertor With Feedback Control, which issued as U.S. Pat. No. 6,469,401 on Oct. 22, 2002, which is a continuation of, and claims the benefit of the filing date of, U.S. patent application Ser. No. 09/542,974, filed Apr. 4, 2000, entitled Engine Driven Invertor With Feedback Control, which issued as U.S. Pat. No. 6,310,321 on Oct. 30, 2001, which is a continuation of U.S. patent application Ser. No. 09/238,361, filed Jan. 27, 1999, entitled Engine Driven Invertor With Feedback Control, which issued as U.S. Pat. No. 6,111,217, on Aug. 29, 2000, and which is a continuation of U.S. patent application Ser. No. 08/858,129, filed May 19, 1997, entitled Engine Driven Invertor With Feedback Control, which issued as U.S. Pat. No. 5,968,385 on Oct. 19, 1999.

FIELD OF THE INVENTION

The present invention relates generally to the art of welding power supplies. More specifically, it relates to inverter welding power supplies driven by an engine.

BACKGROUND OF THE INVENTION

There are different types of prior art welding power supplies. Two types of welding power supplies are phase controlled and inverter-based power supplies. Both types typically receive an ac line (60 Hz) input. However, inverter power supplies can be controlled to a desired frequency, but phase controlled power supplies are limited to the input frequency. Also, phase controlled power supplies cannot be used for pulse spray processes. Inverter-based power supplies are often preferred because they are lighter, have a faster response, provide better weld characteristics, and are better suited for multiple processes (MIG, TIG, stick etc.).

An inverter power supply receives a dc input (often called the dc bus), and switches the input to provide an ac output. Prior art inverter welding power supplies have been designed to receive a line frequency input (60 or 50 Hz), and to rectify that input to produce the dc bus.

The inverted ac output can be, used as the welding output. However, some prior art welding power supplies include a rectifier which rectifies the ac inverter output to provide a dc welding output. The dc input to the inverter is typically obtained by rectifying an ac line input. Many inverter power supplies have controls which allow the power supply to effectively convert the ac line power into useful dc (and sometimes ac) welding power.

Engine driven generators used in welding are also common. An engine driven welding power supply is necessary for applications where the user needs to weld at multiple locations and finds it necessary to move the welding power supply. An auxiliary power output (110 or 220 VAC) is usually provided for power tools, lights etc. Typically, engine driven generators are used to drive a simple tapped reactor or phase controlled power supplies. They often require an engine and generator specifically designed for the welding power supply, which can be more expensive than using a standard engine/generator. Phase controlled engine drive welding power supplies necessarily include all of the disadvantages of phase controlled power supplies.

Another prior art engine driven welding power supply is a dc welding power supply, wherein the dc output of the generator is used directly for a dc welding output. Such a welding power supply, with field control, is shown in U.S. Pat. No. 4,465,920, issued to Hoyt et al.

A few prior art inverter welding power supplies have been connected to a generator output and used as engine driven inverter welding power supplies. The generator ac output serves as the ac inverter input (which is rectified to create the dc bus). This arrangement creates many problems. First, inverter based welding power supplies have heretofore been designed to receive the relatively stable and constant ac line voltages. A generator does not always produce such a stable and constant output. Second, there has not been an integrated control system wherein the engine and or generator is controlled in response to the welding output or inverter operating parameters. Thus, these engines usually operate at full throttle constantly, and are very inefficient.

The common practice of providing an auxiliary power output on the generator has at least one disadvantage. The auxiliary power is single phase, 120 or 240 VAC at 50 or 60 Hz, and is used for power tools, lights etc. However, the single phase output unbalances the three phase output, and the result is harmonic distortion in all three phases. The distortion will cause one of the phases to have much higher peak voltage than the other two phases. The unusually high peak voltage may damage the inverter input capacitors, or require larger capacitors.

The distortion is caused by a backward component of a magnetic field wave. When a three phase load is present the three stator currents produce a magnetic field wave that rotates in the same direction as, and at the same speed as, the rotor. Thus, there is no relative motion between the rotor and the magnetic field wave, and the magnetic field wave does not induce any voltage in the rotor. However, when the load is unbalanced the magnetic field wave created by the stator currents does not move at the speed as and in the same direction as the rotor. The magnetic field produced by the stator currents when an unbalanced load is present may be resolved into two components: a forward component that is in the same direction and at the same speed as the rotor, and a backward component. The forward component behaves as a balanced three phase load, and does not cause a problem. The backward component is moving at the same speed as the rotor, but in the opposite direction. Thus, it has a motion relative to the rotor of twice the generator speed. This "moving" magnetic field will induce voltage in the rotor field winding, which causes the high output voltage. Damper cages have been used in generators (although not necessarily in the welding art) to counter-act or compensate for the effect of unbalanced loads.

Accordingly, it would be beneficial to have an inverter-based welding power supply that is engine driven where the control is integrated to control the engine and generator in response to either welding or inverter operating parameters. Preferably the generator will counter-act or compensate for the effect of unbalanced loads. Also, the power supply will preferably be able to be used for pulse spray and other welding processes.

SUMMARY OF THE PRESENT INVENTION

According to a first aspect of the invention a method for providing welding power includes generating an electrical output with an engine and an ac or dc generator. The output is rectified if needed, and inverted to provide an ac inverter output. The engine is controlled using feedback indicative of a welding output operating parameter.

Another aspect of the invention is controlling engine speed in response to the feedback. Also, the speed may be specifically controlled to select between an idle speed and a run speed in response to the feedback. Other aspects include controlling one or more of a throttle position, a fuel pump, an injection timer, a fuel to air ratio, fuel consumption and ignition timing.

Another aspect of the invention is having the feedback be responsive to one or more of the welding current, welding voltage, welding power, or functions thereof.

Another aspect of the invention is obtaining a signal responsive to the output power and a function thereof by multiplying signals representative of the voltage and current to obtain a signal representative of the power, and then integrating the signal representative of the power.

Yet another aspect of the invention includes the step of storing energy after rectifying, and controlling the engine by increasing engine speed when the energy stored decreases past a threshold.

One alternative aspect of the invention is having the feedback be responsive to ripple in the output. Another alternative aspect includes the step of rectifying the inverter output to provide a dc welding output.

Another aspect of the invention is a stand alone welding power supply that includes a primary mover mechanically coupled to a rotating shaft. A generator includes a rotor mechanically coupled to the shaft and the generator also includes a stator magnetically coupled to the rotor. Thus, the generator provides an ac output. An inverter is connected to the ac output through a rectifier and the inverter inverts power from the ac input to provide an inverted output. A controller is coupled to the engine and has a feedback input connected to a feedback circuit. The feedback circuit is also coupled to the welding output, and a signal responsive to at least one welding output operating parameter is provided to the feedback input. A dc generator, without subsequent rectification, is used in another embodiment.

Yet another aspect of the invention includes a speed control for the primary mover and the controller includes an output coupled to the speed control, wherein the speed of the primary mover is controlled in response to the feedback signal. One embodiment provides for selecting between an idle and run speed in response to the feedback signal. Alternatives include controlling one or more of a throttle position, a fuel pump, an injection timer, a fuel to air ratio, fuel consumption and ignition timing.

Other aspects of the invention include deriving the feedback from welding current, welding voltage, welding power, ripple current, ripple power, ripple voltage and/or functions thereof. The power and a function thereof may be obtained from a circuit that multiplies signals representative of voltage and current to obtain a signal representative of power, and a circuit that integrates the signal representative of power.

Yet another aspect of the invention includes one or more input energy storage device that stores energy after rectification and wherein the controller causes the engine to increase speed when the energy stored decreases past a threshold.

Another aspect includes a rectifier coupled to the inverter output to provide a dc welding output.

Other principal features and advantages of the invention will become apparent to those skilled in the art upon review of the following drawings, the detailed description and the appended claims.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular engine, generator, converter, controller and feedback system, it should be understood at the outset that the invention may include the addition of other components, removal of components, or the substitution for components. The preferred example, including component values, is not limiting, rather it as exemplary. One skilled in the art should be able to use other components and component values to implement this invention. This invention relates to a stand-alone welding power supply. As used herein, stand alone means a welding power supply that includes a generator, rather than a welding power supply which derives power from the ac line power line. In other words, a stand alone welding power supply produces power, rather than converts ac line power. Also, a stand alone welding power supply may have the mechanical and electrical portions in a single case, it may be modular, or the engine, generator and electrical power supply may each be separate.

Figure 1:
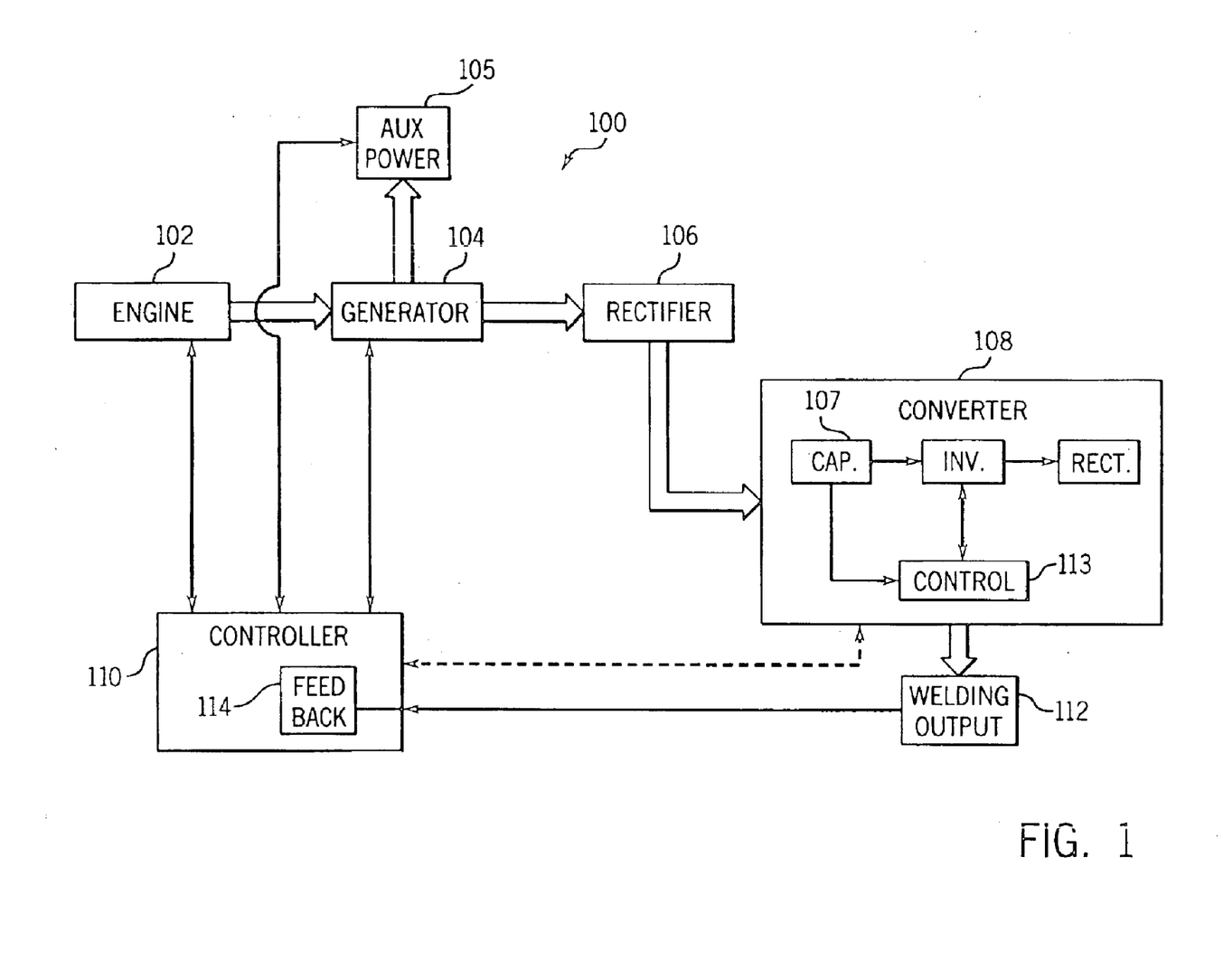
FIG. 1 is a block diagram of the preferred embodiment of the present invention.

A block diagram of an engine driven inverter based welding power supply 100 is shown in FIG. 1, where the thick black lines indicate power transmission, and the thin lines indicate control or feedback signals. Welding power supply 100 includes an engine 102, a generator 104, an aux power output 105, a rectifier 106, a converter 108, a controller 110, and a welding output 112. Generally speaking, engine 102 is a gas or diesel powered engine (a primary mover) that drives a shaft on which a rotor of generator 104 is mounted. Any engine suitable for the desired power output may be used, and in the preferred embodiment the engine is a commercially available diesel engine, model DH905 or DH1005, made by Kubota. This model includes a lever that is used to select between idling speed and a run (or higher)

speed. As used herein run and running speed refer to a higher than idle speed.

Generator 104 may be a typical generator having a rotor and stator, and, in the preferred embodiment, is designed by using a single phase generator such as that used in the Metro™ welding power supply available from the assignee of this invention. The auxiliary and welding winding of the Metro™ are replaced with three phase windings for this invention. The rotor is magnetically coupled with the stator, and a field current is supplied such that when the rotor is turned, an ac output current is produced.

The electrical output of generator 104 is provided to a rectifier 106, which produces rectified dc power. The rectified dc power is provided to converter 108, which includes, in the preferred embodiment, at least one energy storage device such as a capacitor 107 for smoothing the ripple in the rectified signal to provide a dc bus. An alternative embodiment uses a dc generator instead of ac generator 104 and rectifier 111, or rectifier 111 may be part of generator 104, or between generator 104 and converter 108.

Converter 108 also includes, in the preferred embodiment, an inverter 109 and rectifier 111 that convert the smoothed and rectified dc signal to a welding output (having an appropriate current and voltage). Converter 108 is in the preferred embodiment, a series resonant converter that inverts the dc bus and an output rectifier to produce a dc welding current as the welding output 112. An ac output is used in an alternative embodiment, A suitable series resonant converter is described in detail in U.S. patent application Ser. No. 08/584,412, which is owned by the assignee of the present invention, and is hereby incorporated by reference. This converter is also available commercially, from the assignee of the present invention, as the XMT304™ power supply.

As described in application Ser. No. 08/584,412, a power control circuit 113 is included in converter 108 such that the welding current is selected by the operator, and the converter provides the desired current. Various control functions including a hot start and a protection system are also described therein Modifications to the XMT304™ series resonant converter to adapt it to this invention includes removing the autolink feature and reducing the OCV command. Additional modifications are described below.

One advantage of using the preferred power source is that it readily adaptable to use in a wide range of welding processes. For example, by including an Optima™ or 60M™ controller, each available from the present assignee, a pulse spray process may be performed. Other processes include short arc, spray CV, spray CC, CC stick, CC TIG, pulse MIG, or pulse TIG (for example using a PC300™ controller). These process may be performed using the inventive engine driven inverter welding power supply.

Other converters, such as hard switched inverters, may also be used to implement the present invention. The specific converter or inverter selected is not important, so long as it is properly controlled to provide the desired output current. Converter, as used herein, is a switched circuit that converts an ac or dc input to a different ac or dc output. Inverter, as used herein, is a switched circuit having a dc input and provides an ac output, or one that has an ac input and a rectifier to produce a dc signal that is then switched to produce an ac output that may. Also, an inverter, as used herein, may include an output rectifier to produce a dc output.

Controller 110 is provided to control the engine in response to feedback from the welding output. Feedback, as used herein, includes a signal indicative of or responsive to an output or intermediate signal, which is provided to the controller and which control decisions are made in response thereto. Feedback is not intended to encompass the user observing the process and the user making adjustments in response to the observations. The feedback signal may be any welding operating parameter, such as current, voltage, frequency, power, ripple current, ripple magnitude, ripple voltage, ripple frequency, or functions thereof. The specific parameter fedback may be mathematically operated on as required by the control scheme.

One alternative embodiment includes the control of the generator by controller 110, as shown by the arrow from controller 110 to generator 104. However, this control should be considered as an alternative to, or an optional addition to, the control of engine 102 by controller 110. Also, the control scheme of the preferred embodiment is not intended to be limiting. Rather, the invention broadly encompasses feedback in a welding power supply to control an engine/generator.

Specifically, in the preferred embodiment, controller 110 includes a feedback circuit 114 that is connected to the welding studs to obtain a welding current and welding voltage feedback signal. The specific feedback circuit will be described in detail later. Feedback circuit 114 is, in an alternative embodiment, separate from controller 110. However, whether it is separate from, or part of, controller 110 is not important for the present invention. Also, controller 110 may be on the same circuit board as control circuit 113. It may be useful to make controller 110 part of control circuit 113 since they may share feedback signals.

Controller 110 uses the feedback signal to determine the input power needed by converter 108. Then, the speed of engine 102 is adjusted to provide that needed power. Generally, an engine speed control is controlling the speed of the engine, which controls the power output of the generator. Specifically, in the preferred embodiment, control circuit 113 causes engine 102 to operate at either an idle speed, or a run speed (close to or at full throttle). A solenoid may be used to move the run/idle lever to the desired position. Alternatively, more than two positions (run/idle) or a continuous range of positions may be selected, based on the power needed. One alternative embodiment includes using controller 110 to control at least one of a throttle position, a fuel pump, an injection timer, a fuel to air ratio, fuel consumption and ignition timing.

The decision to operate at idle or run is made based on an integrated power in the preferred embodiment. This allows the operating speed of engine 102 to be determined from energy needed instead of instantaneous or peak power.

More specifically, as stated above, converter 108 includes a "hot start" feature wherein the power draw at the start of a weld is momentarily high to aid in striking of the arc and preventing sticking of the arc. This will cause a high peak or instantaneous power draw. However, the total energy used in such a hot start is not of a sufficient magnitude to decrease the energy stored by capacitor(s) 107 to a level at which the inverter will not operate properly. Thus, controller 110 integrates the power at welding output 112 (which is directly related to the energy drained from capacitor(s) 107). When the integrated power exceeds a threshold, based on how much energy can be drained from capacitors 107, the engine is caused to operate at high speed. The engine continues to run at high speed until power being drawn is no longer above the threshold.

The engine, in the preferred embodiment, provides 4 Kw of inverter output power in the idle mode. Thus, so long as the converter does not output more than 4 Kw of power the engine produces as much power as needed while idling. If more than 4 Kw of power is output by converter 108 for a short period of time (such as during the hot start) the engine does not need to speed up. Thus, the inverter output power is integrated, to the extent it exceeds about 4 Kw. When the integrand exceeds a threshold, the engine is caused to run at a higher speed. The integrand is reset to zero periodically.

Figure 2A:
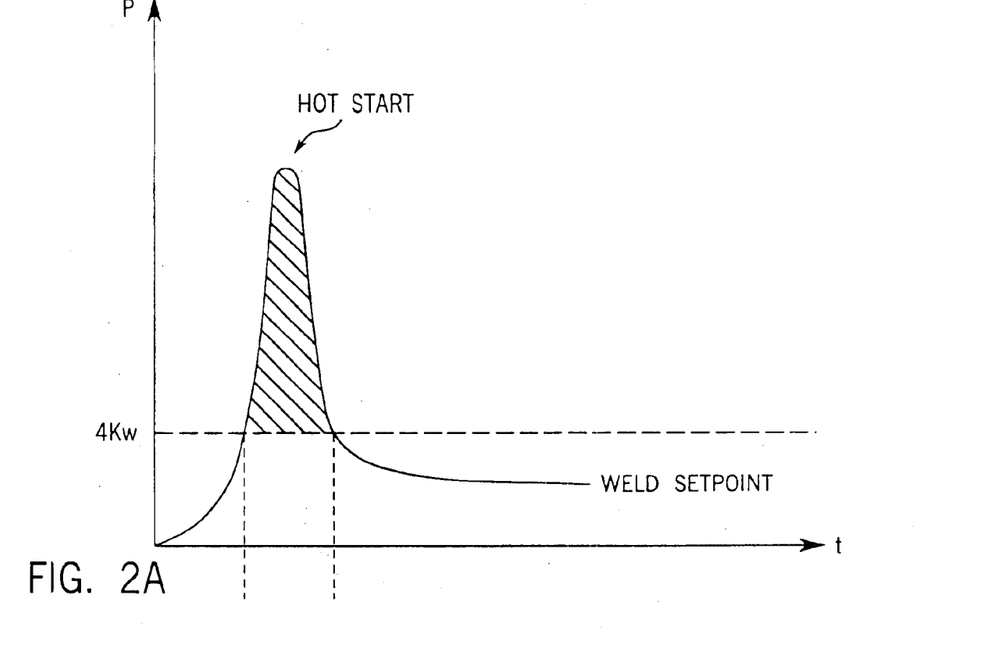
FIGS. 2A and 2B are graphs showing power and integrated power.
Figure 2B:
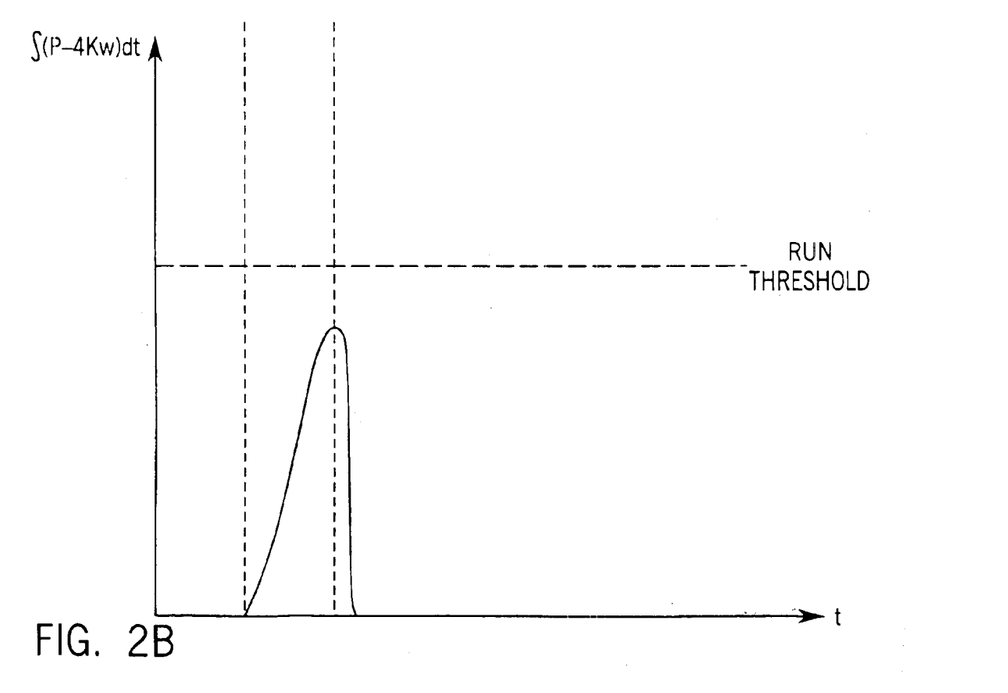

FIG. 2A illustrates this control scheme. Power (at the welding studs) is plotted on the Y axis, and the X axis indicates time. The 4 Kw idle output is shown with a dashed line. The graphs shows that the welding set point is below 4 Kw, thus, on a long-term basis the engine can provide sufficient power while idling. However, as may be seen, the "hot start" causes the instantaneous power to exceed 4 Kw. Controller 110 integrates the cross hatched area, which is the energy drain on the capacitors when the engine is idling. FIG. 2B shows the integrand plotted over time. If the integrand exceeds the run threshold, then controller 110 causes engine 102 to operate at a higher speed.

One alternative embodiment of controller 110 includes circuitry to decide whether to run at idle or high speed based on the machine settings. When an operator is going to weld, they set controls (typically on a power supply front panel) indicating the welding parameters, such as current, process, voltage, etc. The setting may be dialed or typed in, and controller 110 monitors one or more of these settings, and determines from a look-up table, microprocessor, or analog circuit whether or not the engine will need to operate at running speed, or if idling will suffice. The throttle lever is moved in accordance with that determination.

Figure 3:
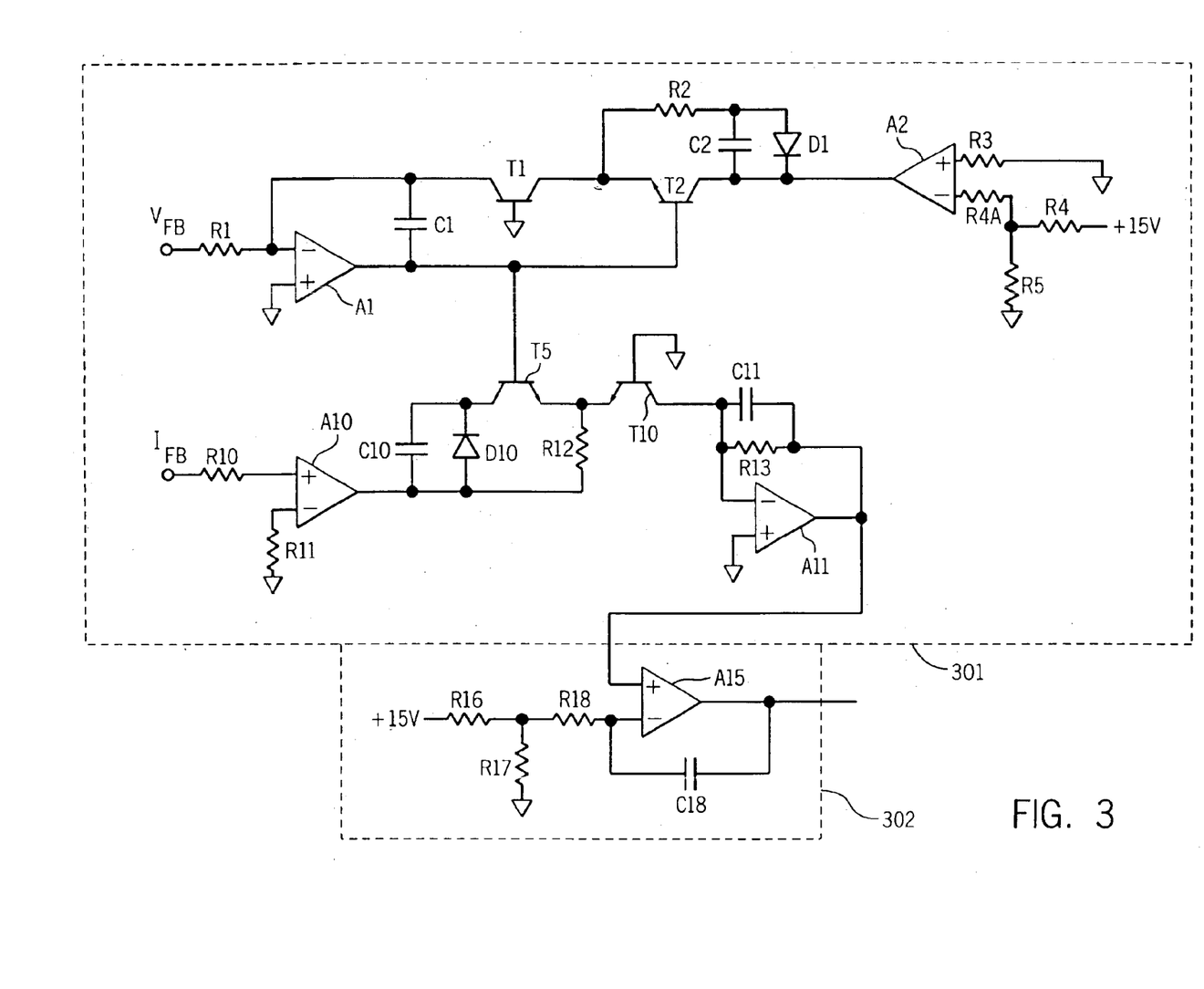
FIG. 3 is a schematic of part of a controller for controlling engine speed.

FIG. 3 is the circuit diagram of a multiplier 301 and an integrator 302 of controller 110. A signal $V_{fb}$ is responsive to the welding output voltage, and is provided through a circuit including a plurality of resistors R1 (100 K ohms), R2 (2 K ohms), R3 (100 K ohms), R4 (45 K ohms), R4A (100 K ohms) and R5 (3.32 K ohms), a pair of op amps A1 and A2, a pair of capacitors C1 (330 µF) and C2 (47 pF), a diode D1 and a pair of transistors T1 and T2. The components are arranged such that the signal provided to the base of a transistor T5 is indicative of the voltage magnitude.

A signal $I_{fb}$ is responsive to the welding output current, and is obtained using a LEM. $I_{fb}$ and is provided through an op amp A10, including a pair of resistors R10 (100 K ohms) and R11 (150 ohms), and a capacitor C10 (22 Pf), a diode D10 to the collector of transistor T5. A feedback resistor R12 is also provided. Another transistor T10, a capacitor C11 (0.001 µF), a resistor R13 (10 K ohms) and an op amp A11 are connected to the emitter of transistor T5 such that the output of op amp A11 is a signal indicative of and responsive to the power at the welding studs (i.e. a power feedback signal).

The power feedback signal is provided to integrator circuit 302 which includes an op amp A15 and resistors R18 (10 K ohms), R16 (562 K ohms), R17 (12.1 K ohms) and a feedback capacitor C18 (0.1 µF). The output of op amp A15 is the integrated power when the power exceeds 4 Kw, and is used by controller 110 to determine when to cause the engine to operate at run speed. Resistors R16 (562 K ohms) and R17 (12.1 K ohms) set the 4 KW level, and resistor R18 (10 K ohms) and capacitor C18 (0.1 µF) provide an RC integrating time constant. The decision can be made by controller 110 using a simple comparator having a threshold as one input and the output of op amp A15 as the other input.

Figure 4:
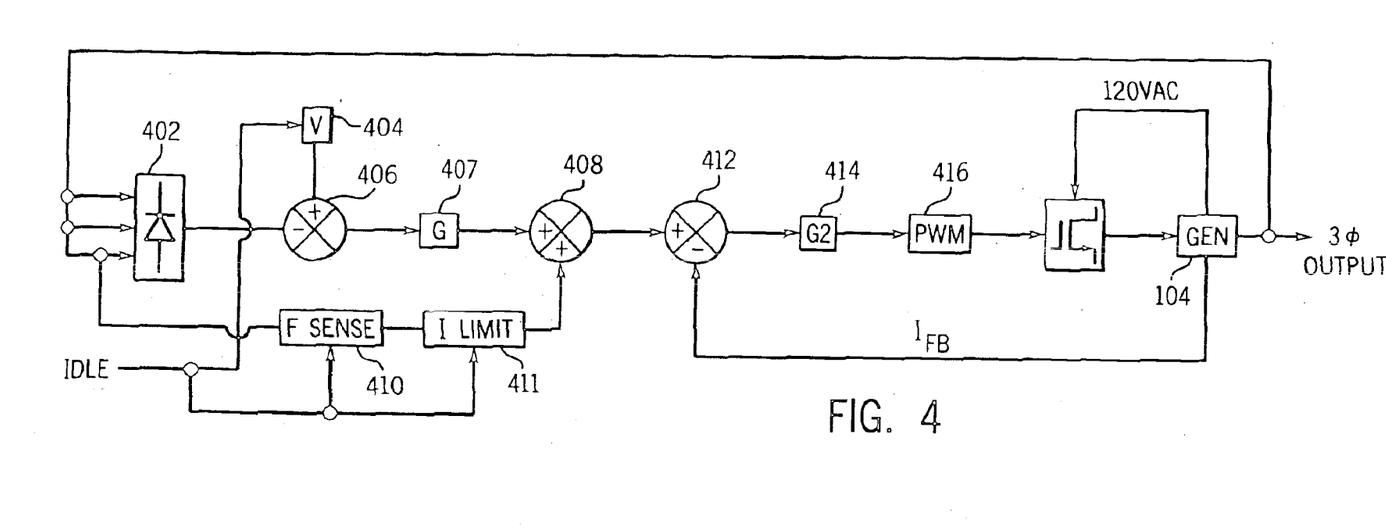
FIG. 4 is a control diagram for a generator field current controller.

FIG. 4 shows a voltage regulator 401 that regulates the voltage of generator 104. Voltage regulator 401 is part of controller 110 in the preferred embodiment, although it may be separate from controller 110. Generally, voltage regulator 401 controls the generator field current such that the output voltage of the generator is at a desired level.

Specifically, a rectifier/scaler 402 receives the three phase generator output voltage, and rectifies and scales it. A voltage command 404 receives as an input the signal indicating whether the engine is in the run or idle mode, and provides a set point command signal to an adder 406. Thus, the set point command is one of two values, depending upon whether the engine is idling or running at high speed. Adder 406 also receives the scaled three phase voltage and its output is an error signal. The error signal is provided to a gain stage 407, and then to an adder 408.

A frequency sensor 410 senses the frequency of the generator (which is indicative of engine speed) and provides a signal to a limiter 411 that is used by adder 408 to limit the field current. Frequency sensor 410 receives as another input the run/idle command, and different field current limits are set, depending on whether the engine is running at high speed or idling. Thus, adder 408 provides a field current command signal that is a function of the error, and is limited by the engine/generator frequency and the run/idle selection.

The field current command signal is provided to an adder 412, which also receives a field current feedback signal. The output of adder 412 is the difference between the field current command and feedback, and is thus a field current error signal. The error signal is provided to another gain stage 414. A PWM chip 416 compares the field current error signal to a threshold, and turns on and off a transistor as need. The transistor connects the 120 VAC field power to the field of generator 104.

Figure 5:
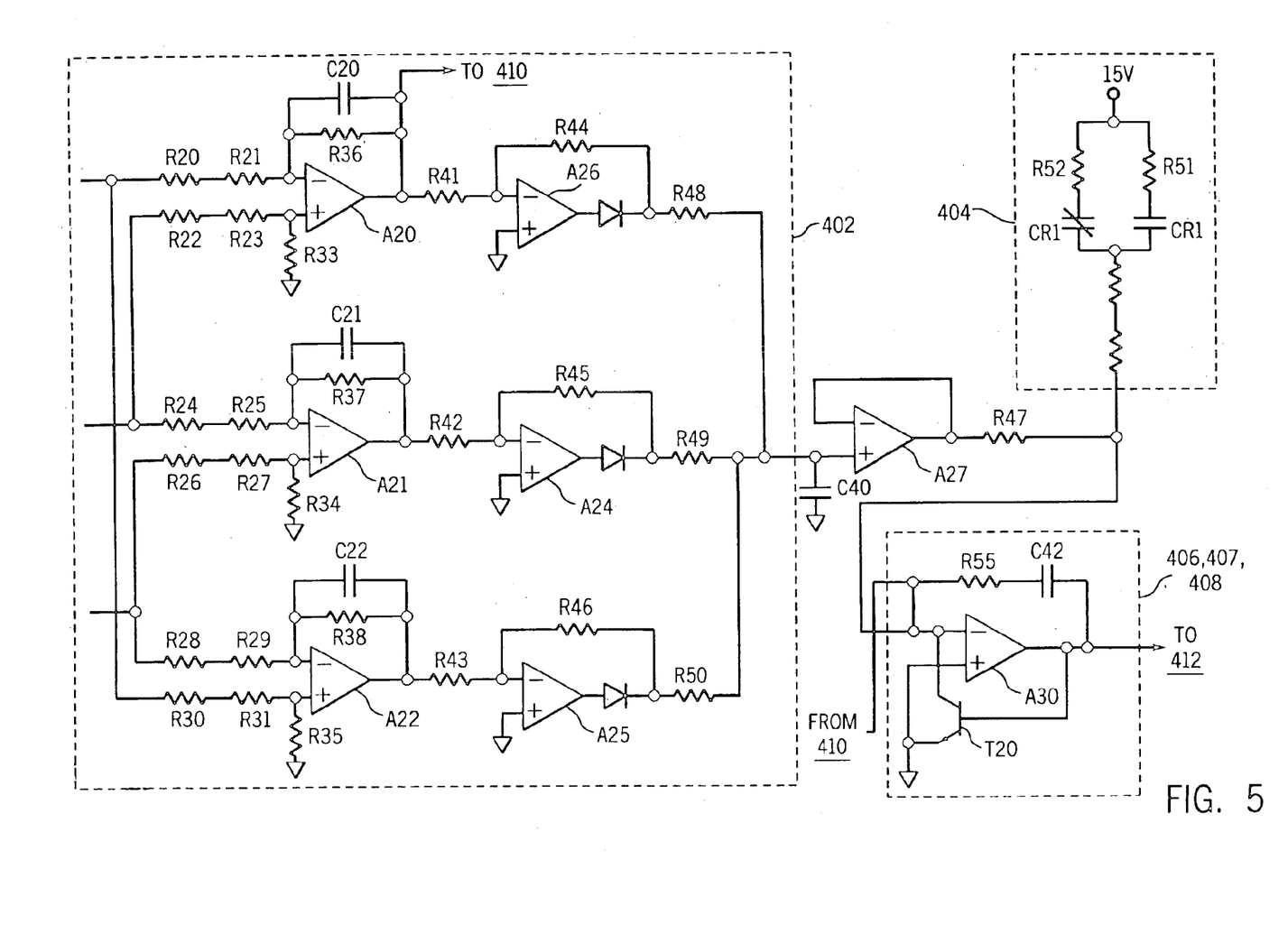
FIGS. 5–7 are circuit diagrams which implement the control diagram of FIG. 4.
Figure 6:
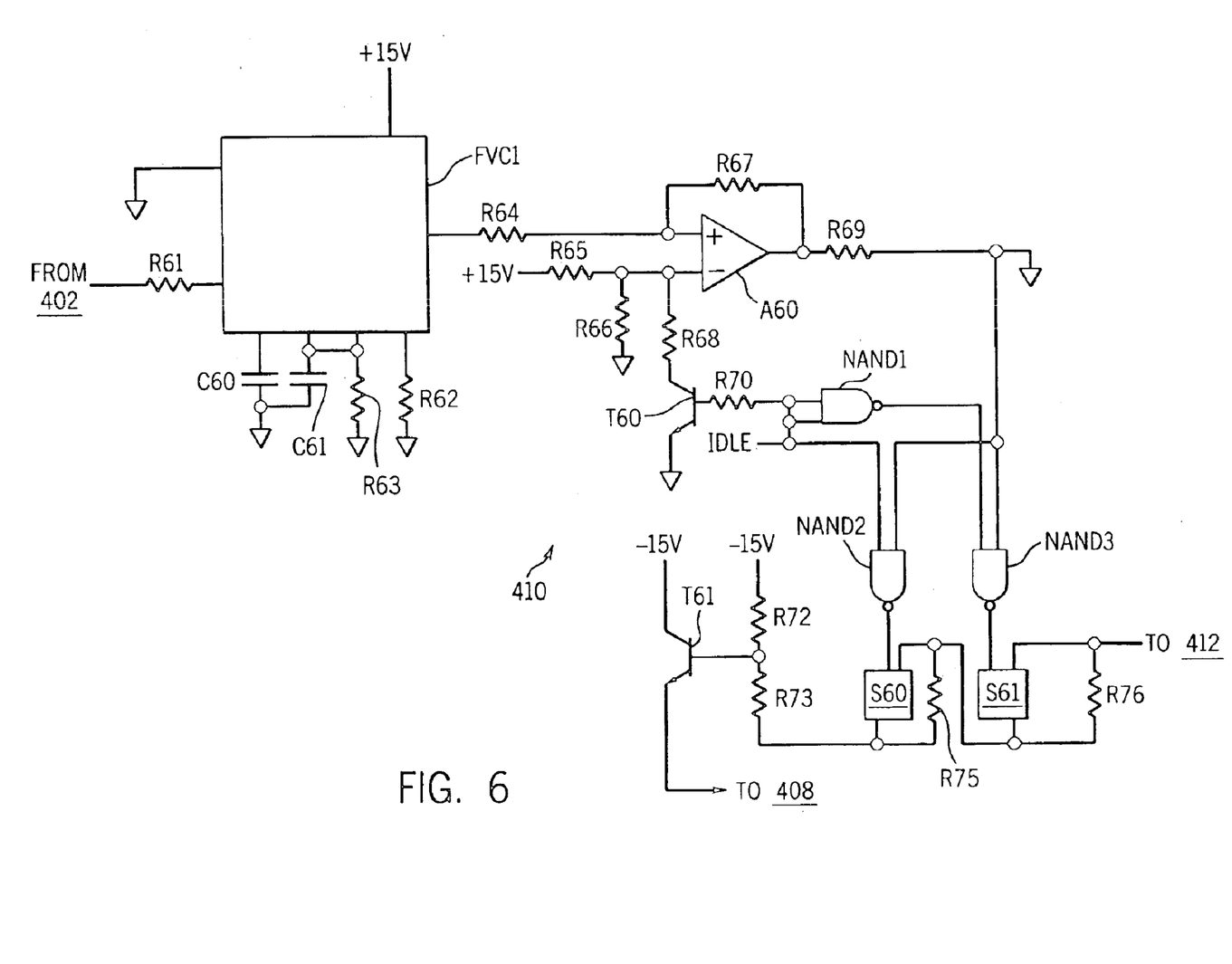
Figure 7:
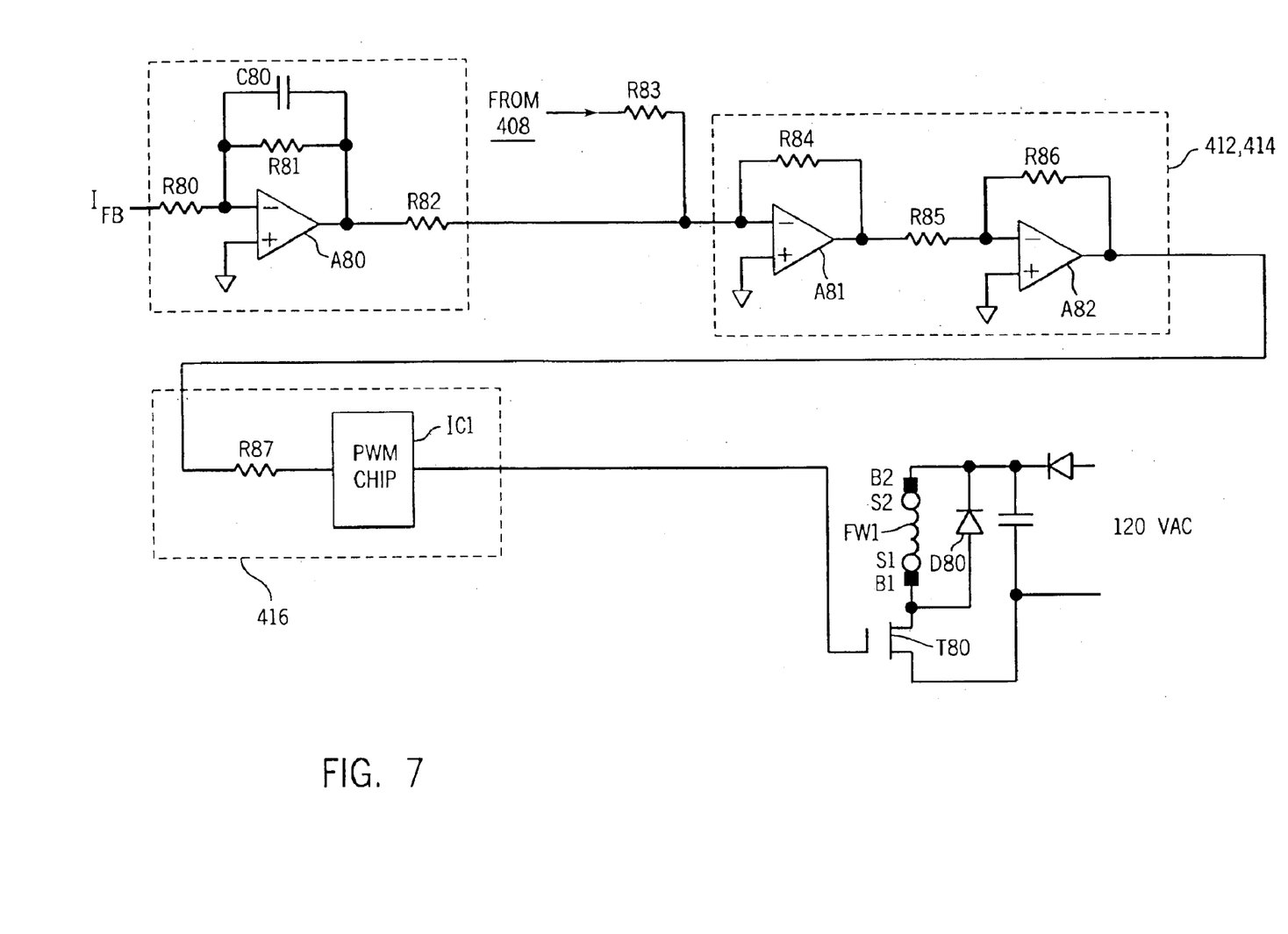

A circuit which implements this scheme is shown in FIGS. 5–7. Rectifier/scaler 402 is shown schematically on FIG. 5, and includes three identical circuits, each of which has a unique two of the three phases as inputs. Generally, each circuit includes nine feedback and scaling resistors (R20–50), two op amps (A20–A25), and a capacitor (C20–C22). The components have the following values: resistors R20, R24 and R28 are 332 K ohms, resistors R21, R25 and R29 are 16.2 K ohms, resistors R22, R26 and R30 are 332 K ohms, resistors R23, R27 and R31 are 16.2 K ohms, resistors R33, R34 and R35 are 12.1 K ohms, resistors R36, R37 and R38 are 12.1 K ohms, resistors R41, R42 and R43 are 10 K ohms, resistors R44, R45 and R46 are 10 K ohms, resistors R48, R49 and R50 are 100 K ohms and capacitors C20, C21 and C22 are 0.01 µF. The output is summed and buffered by op amp A27 and resistor R47 (15 K ohms) and capacitor C40 (0.01 µF).

Voltage command 404 includes resistor R51 (10.8 K ohms) and R52 (6.75 K ohms) and a relay CR1. One of the contacts of CR1 is open, and the other closed, depending on whether idle or run is selected.

Adder 406, gain stage 407, and adder 408 are also shown on FIG. 5. They include an op amp A30, a feedback resistor R55 (3.32 K ohms), a feedback capacitor C42 (1 µF), and a transistor T20. These components are configured to provide an output that is the error of the voltage command from the setpoint, limited by the frequency sense circuit 410.

Frequency sense circuit 410 is shown on FIG. 6 and receives an input from scaler/rectifier 410. That input is provide through a resistor R61 (475 K ohms) to a frequency-voltage converter chip FVC1. Frequency-voltage converter chip FVC1 is conventionally configured and includes associated components resistors R62 (10 K ohms) and resistors R63, and capacitors C60 (0.1 µF) and C61 (1 µF). The output of FVC1 is provided to an op amp A60, which includes associated components resistors R64 (1 K ohms), R65 (18.2 K ohms), R66 (8.25 ohms), R67 (1M ohms) and R69 (2 K ohms). The idle/run select signal is provided through a transistor T60 and resistors R70 (10 K ohms) and R68 (7.5 K ohms) to one input of op amp A60.

Frequency sense circuit 410 also includes three NAND gates, NAND1, NAND2, and NAND3. The NAND gates, along with a pair of analog switches S60 and S61, and associated circuitry resistors R72 (20 K ohms) and R73 (1.53 K ohms), R75 (3.92 K ohms), R76 (1.74 K ohms) and transistor T61, are configured top provide the limiting signal to adder 408.

One alternative embodiment includes using frequency sense circuit 410 or an alternative circuit to determine if the engine is slowing down to the point where a stall is likely. If controller 110 determines that a stall is likely, then the converter controller may be over-ridden such that the output is temporarily reduced, until the likelihood of a stall is reduced.

FIG. 7 is a schematic of adder 412 and gain stage 414, along with PWM chip 416. The field current feedback signal is scaled by an op amp A80 and resistors R80 (10 K ohms), R81 (56 K ohms) and R82 (10 K ohms). Capacitor C80 is 0.01 $\mu$F. The output of op amp A80 is summed with the command signal from adder 408 by op amp A81 and a resistor R84 (100 K ohms) to provide the error signal. An op amp A82, and resistors R85 (10 K ohms) and R86 (10 K ohms) provide the gain stage. The output of gain stage 414 is provided through a resistor R87 (3.32 K ohms) to a PWM chip IC1 that is configured in a conventional manner to turn on and off a transistor T80 and provide a current to a field winding FW1, a pair of brushes B1 and B2, and a pair of slip rings S1 and S2, in accordance with a desired current level.

Many welding power supplies that operate on an ac power line include an under voltage protection circuit. thus, when the input voltage drops below a threshold a switch is turned on (or off) such that and the power supply controller shuts down the power supply. However, if the load of an engine driven welding power supply increases when the engine is idling, a transient voltage dip occurs. Thus, if the converter controller includes an under voltage protection circuit, it must be removed or modified to accommodate the relatively slow response of the engine.

Figure 11:
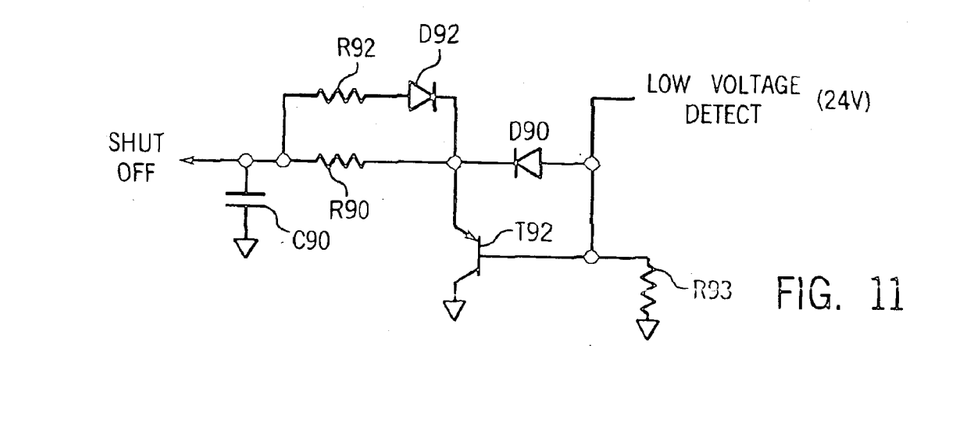
FIG. 11 is a circuit diagram of a delay circuit used in the preferred embodiment.

One embodiment of the present invention includes the use of an RC delay circuit in the under voltage protection circuit that begins to charge when the under voltage switch is turned on. The capacitor continues to charge so long as the switch is on. After a sufficient delay, (1 sec in the preferred embodiment) the under voltage lockout mechanism is activated. The delay circuit is shown in FIG. 11 and the low-voltage detect signal is provided through a diode D90 and a 1M ohm resistor R90 to charge a 1 $\mu$F capacitor C90. When capacitor C90 is charged the low voltage protection shut off signal is provided, but a transient lasting less than the time it takes to charge capacitor C90 (1 sec) is ignored. Capacitor C90 is discharged rapidly through a 100 K ohm resistor R92 and a diode D92, by a transistor T92. Transistor T92 is turned on by a 2 K ohm resistor R93 when the low voltage is not detected. The preferred embodiment uses a 24 volt control board power for the under voltage input, which is derived from, and directly proportional to, the ac input voltage, to check for under voltage.

The preferred embodiment includes the use of a single phase auxiliary power output, 120 VAC at 60 Hz, for power tools, lights etc. 240 VAC and/or 50 hz may also be provided. The auxiliary power may be taken directly from the generator, without pre-conditioning, or it may be pre-conditioned. A damper cage is provided, in the preferred embodiment, to counteract the unbalanced load. Generally, a damper cage is a series of low resistance conductors close to the surface of the rotor pole bodies. The damper cage acts as a low impedance winding on the rotor. The backward magnetic field wave from the stator currents (caused by the single phase load) induces large amounts of current in the damper cage bars. This current induces a magnetic field which tends to cancel the backward magnetic stator wave.

Figure 8:
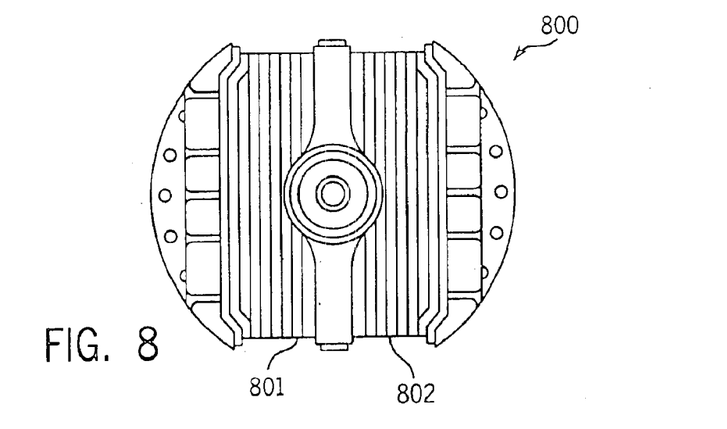
FIG. 8 is an end view of a damper cage.
Figure 9:
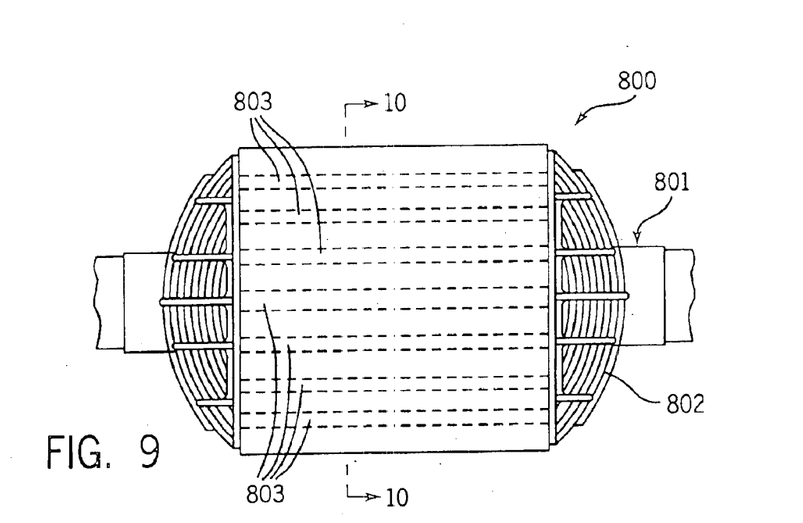
FIG. 9 is a side end view of the damper cage of FIG. 8.
Figure 10:
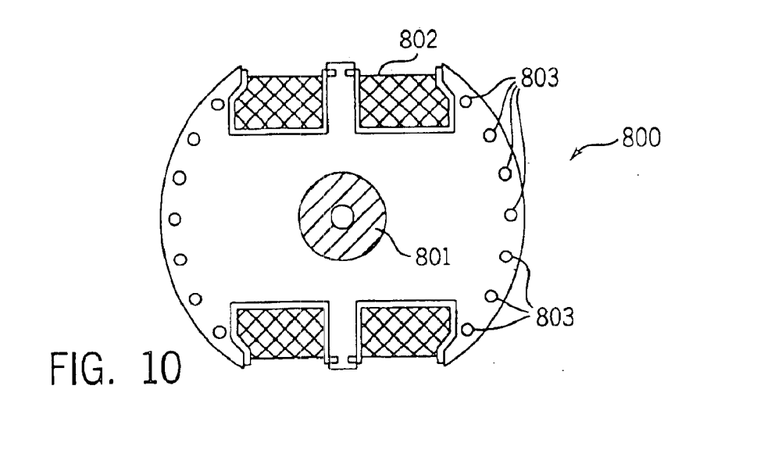
FIG. 10 is a sectional view of the damper cage of FIG. 8, taken along lines 10—10.

Specifically, in the preferred embodiment, the damper cage includes seven aluminum rods 0.25 inches in diameter placed in closed slots. FIGS. 8–10 show an end view, side view, and sectional view, respectively, of a rotor having a damper cage in accordance with the present invention. The rotor is mounted on a shaft 801 and includes winding 802. The seven aluminum bars 803 may be seen in FIGS. 9 and 10. The slots the bars are placed in are, in the preferred embodiment, 0.26 inches in diameter, and 0.03 below the surface. The damper cage is completed with an aluminum piece, cut to the same shape as the lamination, on each end. The rods are TIG welded to the end pieces. Alternative methods of construction include using copper rods silver soldered to copper end pieces, copper rods brazed or welded to a copper ring end piece, or aluminum die casting through the rotor holes. The embodiment shown is a two pole generator, but a generator with four or more poles could also be used.

The preferred embodiment monitors the demand of the aux load, and if necessary causes the engine to run at high speed in response to the aux load. One alternative embodiment that also reduces distortion from the auxiliary power output is to include an aux power feedback circuit in controller 110. Another is to add a large capacitor on the leg which receives the higher voltage. Also, multiple stators may also reduce distortion caused by an unbalanced load.

One alternative embodiment is shown by the dashed control lines in FIG. 1 between controller 110 and converter 108. The feedback signal is obtained from the inverter, rather than the welding output in this embodiment. Controller 110 uses the feedback to determine the desired engine speed. The selected speed may be one of at least two discreet speeds (idle/run e.g.) or from a continuous spectrum of speeds. The parameters used for feedback include one or more of inverter output and/or tank current, inverter output and/or tank voltage, inverter output and/or tank power, ripple parameters and frequency. The "tank" feedback signals may be particularly appropriate when the converter is a series resonant converter. Another alternative includes using an output transformer, and deriving the feedback signals (such as those described above) from the secondary side of the transformer). The feedback signal may, as described above, be a mathematical function of the operating parameter. Another alternative includes controlling at least one of a throttle position, a fuel pump, an injection timer, a fuel to air ratio, fuel consumption and ignition timing of the engine.

Other alternatives include controlling the engine based on a generator operating parameter feedback. The generator operating parameter may be field current, generator output (or inverter input) current, voltage, power, frequency, or aux current, voltage, power or frequency. As described above, the fedback signal may be a mathematical function of the operating parameter. Also as described above, the engine parameter being controlled may be speed, throttle position, a fuel pump, an injection timer, a fuel to air ratio, fuel consumption and ignition timing.

Another alternative is to control the generator in response to the welding and converter operating parameters described above. The field current is controlled in one alternative embodiment.

Other alternatives include controlling the inverter so it operates more effectively with a generator input. One such alternative is described above, wherein the inverter is controlled so that it can operate at low voltages for a period of time. Another alternative is to provide a pre-regulator between the generator and the converter so that the input mimics ac line power. The pre-regulator may include power factor correction, a rectifier, large capacitors or energy storage devices, and a controlled bridge. One alternative embodiment includes a soft switched converter as the pre-regulator, and another is a voltage converter as the pre-regulator. The pre-regulator may be particularly useful when the aux power is derived directly from the generator. Alternatively, the aux power may be pre-regulated. Another alternative is using a 60 Hz inverter to produce the aux power. Either single or three phase can be used as an input to the aux inverter.

Numerous modifications may be made to the present invention which still fall within the intended scope hereof. Thus, it should be apparent that there has been provided in accordance with the present invention a method and apparatus for welding with an engine driven inverter that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A stand alone power supply comprising;
   a primary mover mechanically coupled to a rotating shaft;
   a generator having a rotor mechanically coupled to the shaft, and further having a stator magnetically coupled to the rotor, whereby the generator provides a generator output;
   an inverter having an inverter input in electrical communication with the generator output, wherein the inverter inverts power from the inverter input to provide an inverter output;
   a controller coupled to the primary mover and having a feedback input; and
   a feedback circuit coupled to the inverter output and the feedback input wherein a feedback signal responsive to at least one inverter output operating parameter is provided to the feedback input.

2. The power supply of claim 1, wherein the primary mover includes a speed control and the controller includes an output coupled to the speed control, wherein the speed of the primary mover is controlled in response to the feedback signal.

3. The power supply of claim 2 wherein the speed control includes an idle/run selector for selecting between an idle speed and a run speed in response to the feedback signal.

4. The power supply of claim 2 further including a rectifier that couples the inverter to the ac output, and wherein the inverter includes at least one input energy storage device that stores rectified energy and wherein the controller causes the primary mover to increase speed when the energy stored decreases past a threshold.

5. The power supply of claim 1 wherein the controller includes means for controlling at least one of a throttle position, a fuel pump, an injection timer, a fuel to air ratio, fuel consumption and ignition timing.

6. The power supply of claim 1 wherein the at least one operating parameter is an inverter current.

7. The power supply of claim 6 wherein the at least one operating parameter further includes an inverter voltage.

8. The power supply of claim 7 wherein the feedback circuit includes a multiplier, wherein the multiplier multiplies signals representative of voltage and current to obtain a signal representative of power, and further wherein the feedback circuit includes an integrator to integrate the signal representative of power.

9. The power supply of claim 1 wherein the at least one operating parameter is an inverter voltage.

10. The power supply of claim 1 wherein the operating parameter is a function of a ripple in the output.

11. The power supply of claim 1 further including a rectifier coupled to the inverter output to provide a do inverter output.

12. The power supply of claim 1 wherein the generator is a dc generator.

13. The power supply of claim 1 wherein the generator is an ac generator, and the inverter includes an input rectifier.

14. A stand alone power supply comprising;
   a primary mover mechanically coupled to a rotating shaft;
   a generator having a rotor mechanically coupled to the shaft, and further having a stator magnetically coupled to the rotor, whereby the generator provides a generator output;
   an inverter having an inverter input in electrical communication with the generator output, wherein the inverter inverts power from the inverter input to provide an inverter output;
   control means, coupled to the primary mover and having a feedback input, for controlling the primary mover; and
   feedback means, coupled to the inverter output and the feedback input, for providing a feedback signal responsive to at least one inverter output operating parameter to the feedback input.

15. The power supply of claim 14 wherein the primary mover speed control means for controlling the primary mover's speed, and the control means includes an output coupled to the speed control means, wherein the speed of the primary mover is controlled in response to the feedback signal.

16. The power supply of claim 15 wherein the speed control means includes an idle/run selector means for selecting between an idle speed and a run speed in response to the feedback signal.

17. The power supply of claim 15 wherein the inverter includes at least one input energy storage means for storing energy to be inverted by the inverter, and wherein the control means further includes means for increasing primary mover's speed when the energy stored decreases past a threshold.

18. The power supply of claim 14 wherein the control means includes means for controlling at least one of a throttle position, a fuel pump, an injection timer, a fuel to air ratio, fuel consumption and ignition timing.

19. The power supply of claim 14 wherein the at least one operating parameter is inverter current.

20. The power supply of claim 19 wherein the at least one operating parameter further includes inverter voltage.

21. The power supply of claim 20 wherein the feedback means includes a multiplier means for multiplying signals representative of voltage and current to obtain a signal representative of power, and further wherein the feedback means includes an integrator means for integrating the signal representative of power.

22. The power supply of claim 14 wherein the at least one operating parameter is inverter voltage.

23. The power supply of claim 14 wherein the operating parameter is a function of a ripple in the output.

24. The power supply of claim 14 further including a rectifier means coupled to the inverter output for providing a dc inverter output.

25. The power supply of claim 14 wherein the generator is a dc generator.

26. The power supply of claim 14 wherein the generator is an ac dc generator and the inverter includes a rectifier.

27. A method of providing power comprising;
   generating an electrical output with an engine and generator;
   inverting the electrical input to provide an ac inverter output;
   multiplying signals representative of the ac inverter output voltage and current to obtain a signal representative of power, and integrating the signal representative of power, and providing a feedback responsive thereto; and
   controlling the engine using the feedback.

28. The method of claim 27 wherein the engine speed is controlled in response to the feedback.

29. The method of claim 28 wherein controlling includes selecting between an idle speed and a run speed in response to the feedback.

30. The method of claim 27 wherein controlling includes controlling at least one of a throttle position, a fuel pump, an injection timer, a fuel to air ratio, fuel consumption and ignition timing.

31. The method of claim 27 further including rectifying the inverter output to provide a dc inverter output.

32. The method of claim 27 wherein generating includes generating a dc output.

33. The method of claim 32 further including storing energy after rectification and wherein controlling includes increasing engine speed when the energy stored decreases past a threshold.

34. The method of claim 27 wherein generating includes generating an ac dc output and inverting includes rectifying.

* * * * *